(12) United States Patent
Yamamoto

(10) Patent No.: US 11,861,251 B2
(45) Date of Patent: Jan. 2, 2024

(54) IMAGE FORMING SYSTEM THAT CHANGES ORDER OF RIP ACCORDING TO COMBINATION OF SORTING ORDER AND FACE ORIENTATION AT DELIVERY OF RECORDING MEDIUM HAVING IMAGE FORMED THEREON

(71) Applicant: KYOCERA Document Solutions Inc., Osaka (JP)

(72) Inventor: Takenori Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/125,863

(22) Filed: Mar. 24, 2023

(65) Prior Publication Data
US 2023/0315362 A1 Oct. 5, 2023

(30) Foreign Application Priority Data
Mar. 30, 2022 (JP) .................. 2022-055965

(51) Int. Cl.
*G06F 3/12* (2006.01)
*G06K 15/02* (2006.01)

(52) U.S. Cl.
CPC ............ *G06F 3/125* (2013.01); *G06F 3/1205* (2013.01); *G06K 15/1836* (2013.01)

(58) Field of Classification Search
None
See application file for complete search history.

(56) References Cited

U.S. PATENT DOCUMENTS

| | | | |
|---|---|---|---|
| 2007/0292157 A1* | 12/2007 | Sato | G03G 15/50 399/82 |
| 2011/0199642 A1* | 8/2011 | Utsunomiya | H04N 1/00002 358/1.15 |
| 2011/0211893 A1* | 9/2011 | Shishido | G06F 3/1285 400/76 |
| 2011/0243637 A1 | 10/2011 | Nakamura et al. | |
| 2014/0104338 A1 | 4/2014 | Nakamura et al. | |
| 2021/0055890 A1* | 2/2021 | Ringuette | G06T 7/0002 |

FOREIGN PATENT DOCUMENTS

| | | |
|---|---|---|
| JP | 2011212957 A | 10/2011 |
| JP | 2015042497 A | 3/2015 |
| JP | 2016112748 A | 6/2016 |
| JP | 2019051700 A | 4/2019 |

* cited by examiner

*Primary Examiner* — Henok Shiferaw
(74) *Attorney, Agent, or Firm* — IP Business Solutions, LLC

(57) ABSTRACT

An image forming system includes an input device, an image processing device, an image forming device, a delivery device, and a controller. The controller causes the image processing device to execute RIP operation in forward order with respect to print data, upon receipt, through the input device, of a first instruction indicating one of a combination of reverse order and face-up, and a combination of forward order and face-down, as combination of sorting order and face orientation at delivery of a recording medium having an image formed thereon, and causes the image processing device to execute RIP operation in reverse order with respect to the print data, upon receipt, through the input device, of a second instruction indicating one of a combination of forward order and face-up, and a combination of reverse order and face-down, as the combination of the sorting order and the face orientation at delivery.

5 Claims, 14 Drawing Sheets

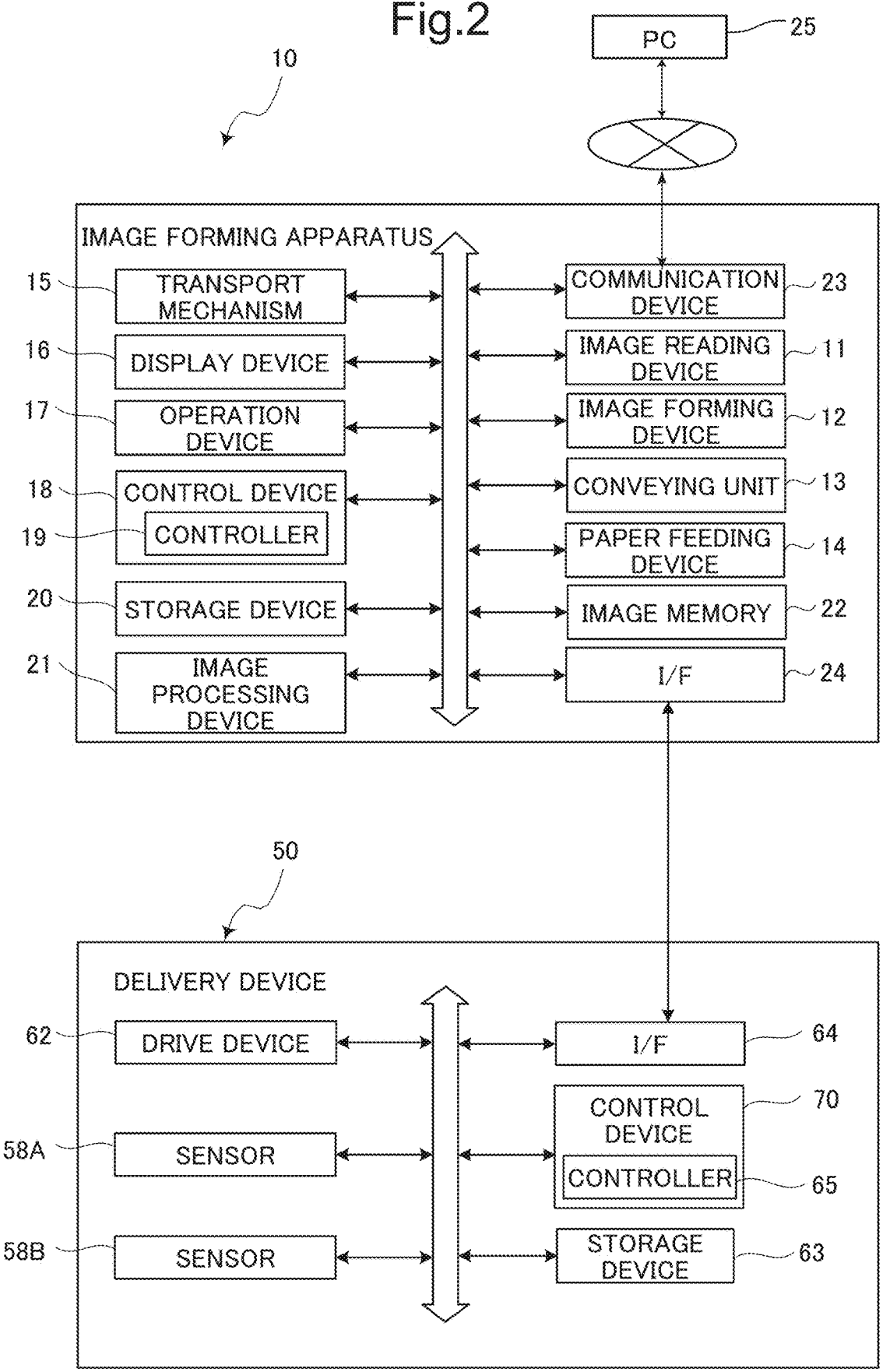

Fig.4

| PRINTING FACE | SORTING ORDER AND FACE ORIENTATION AT DELIVERY | ORDER OF RIP OPERATION | FIRST FACE | SECOND FACE | REVERSE AFTER PRINTING FIRST FACE | REVERSE AFTER PRINTING SECOND FACE |
|---|---|---|---|---|---|---|
| SIMPLEX | REVERSE ORDER AND FACE-UP | FORWARD ORDER (1, 2, 3, 4, 5) | ALL PAGES FORWARD ORDER (1→5) | — | NO | — |
| | FORWARD ORDER AND FACE-DOWN | FORWARD ORDER (1, 2, 3, 4, 5) | ALL PAGES FORWARD ORDER (1→5) | — | YES | — |
| | FORWARD ORDER AND FACE-UP | REVERSE ORDER (5, 4, 3, 2, 1) | ALL PAGES REVERSE ORDER (5→1) | — | NO | — |
| | REVERSE ORDER AND FACE-DOWN | REVERSE ORDER (5, 4, 3, 2, 1) | ALL PAGES REVERSE ORDER (5→1) | — | YES | — |
| DUPLEX | REVERSE ORDER AND FACE-UP | FORWARD ORDER (1, 2, 3, 4, 5) | ODD-NUMBERED PAGE (1, 3, 5) | EVEN-NUMBERED PAGE (2, 4) | YES | YES |
| | FORWARD ORDER AND FACE-DOWN | FORWARD ORDER (1, 2, 3, 4, 5) | ODD-NUMBERED PAGE (1, 3, 5) | EVEN-NUMBERED PAGE (2, 4) | YES | NO |
| | FORWARD ORDER AND FACE-UP | REVERSE ORDER (BLANK, 5, 4, 3, 2, 1) | EVEN-NUMBERED PAGE (5, 3, 1) | ODD-NUMBERED PAGE (BLANK, 4, 2) | YES | YES |
| | REVERSE ORDER AND FACE-DOWN | REVERSE ORDER (BLANK, 5, 4, 3, 2, 1) | EVEN-NUMBERED PAGE (5, 3, 1) | ODD-NUMBERED PAGE (BLANK, 4, 2) | YES | NO |

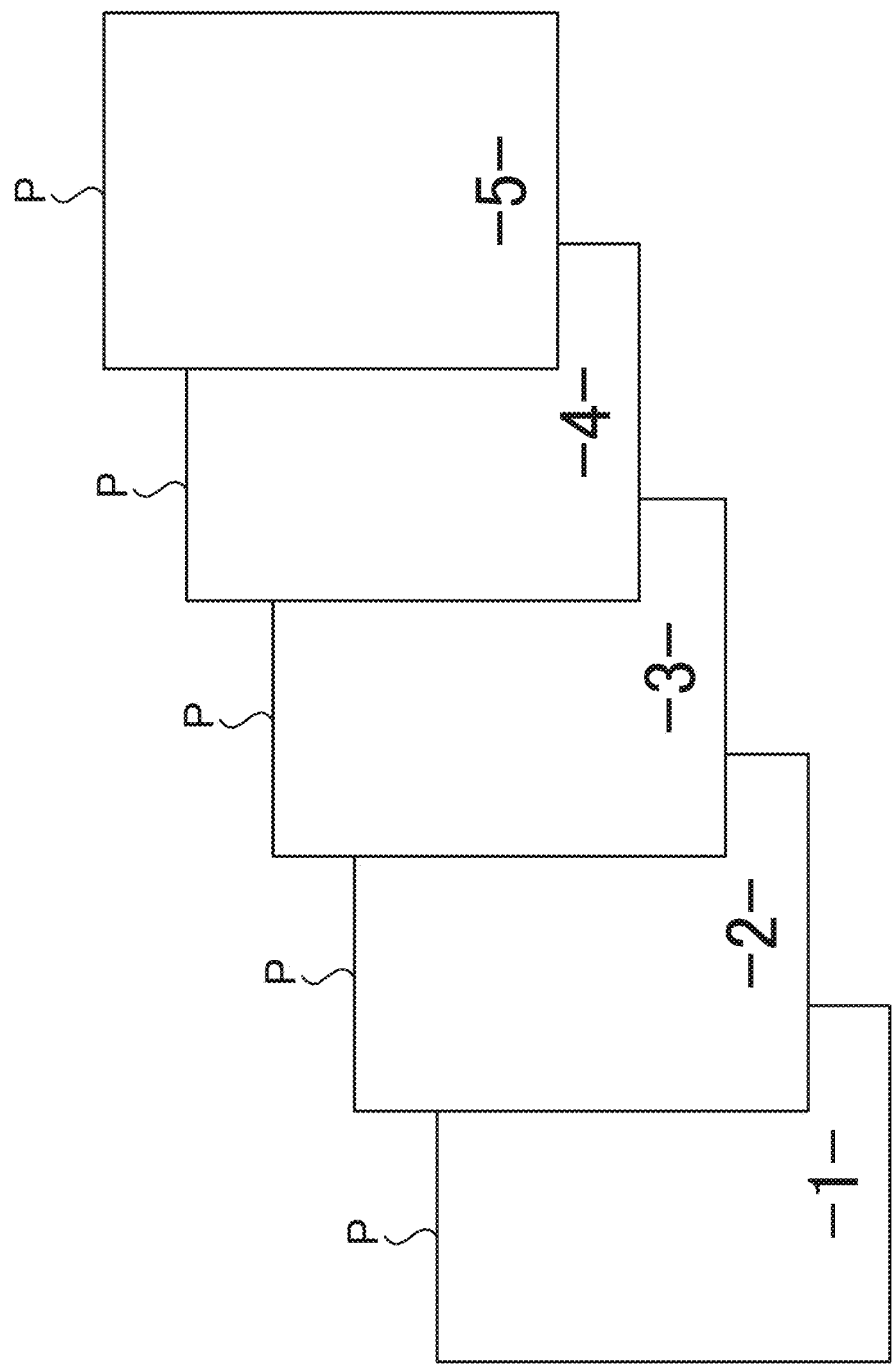

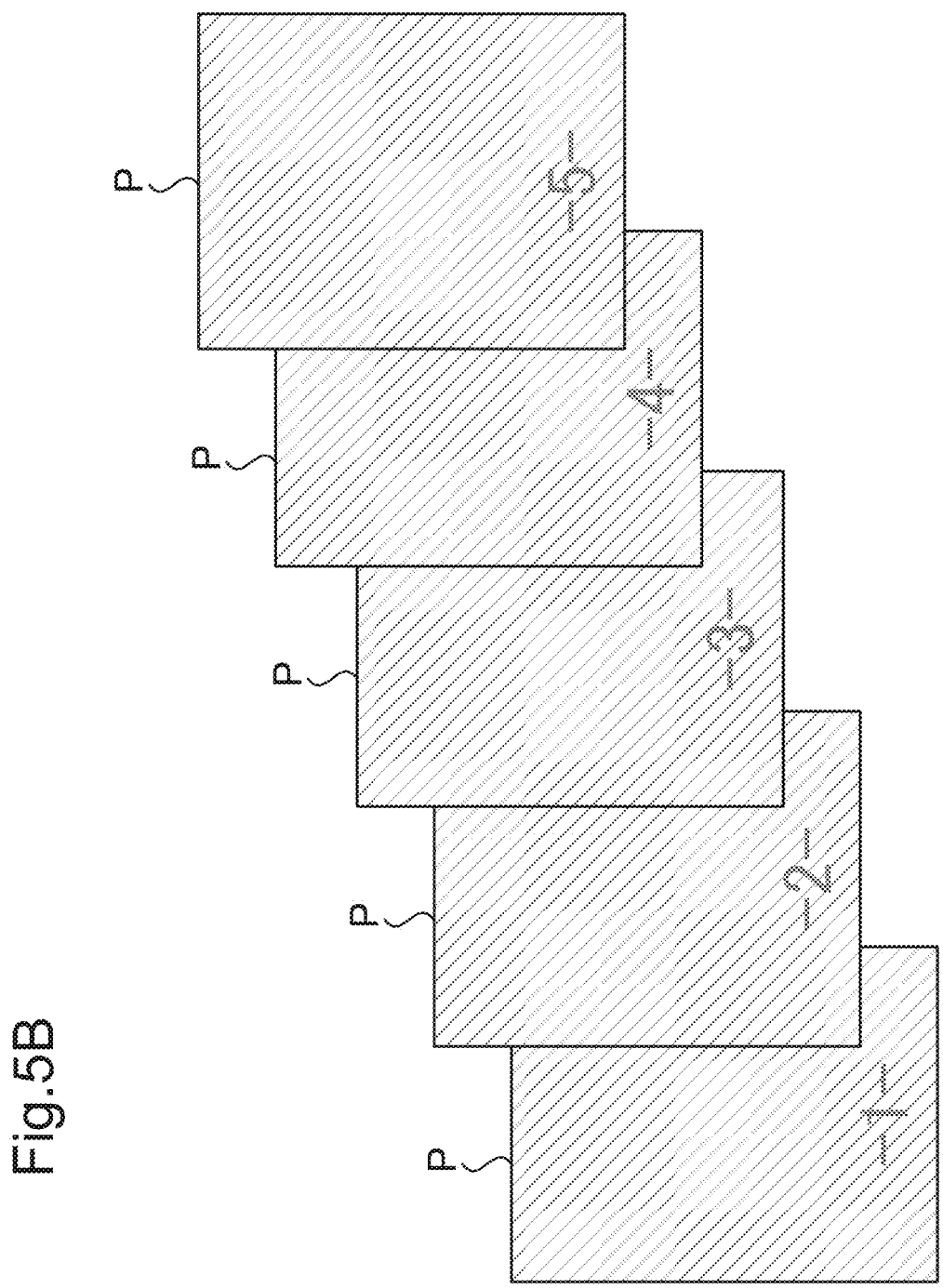

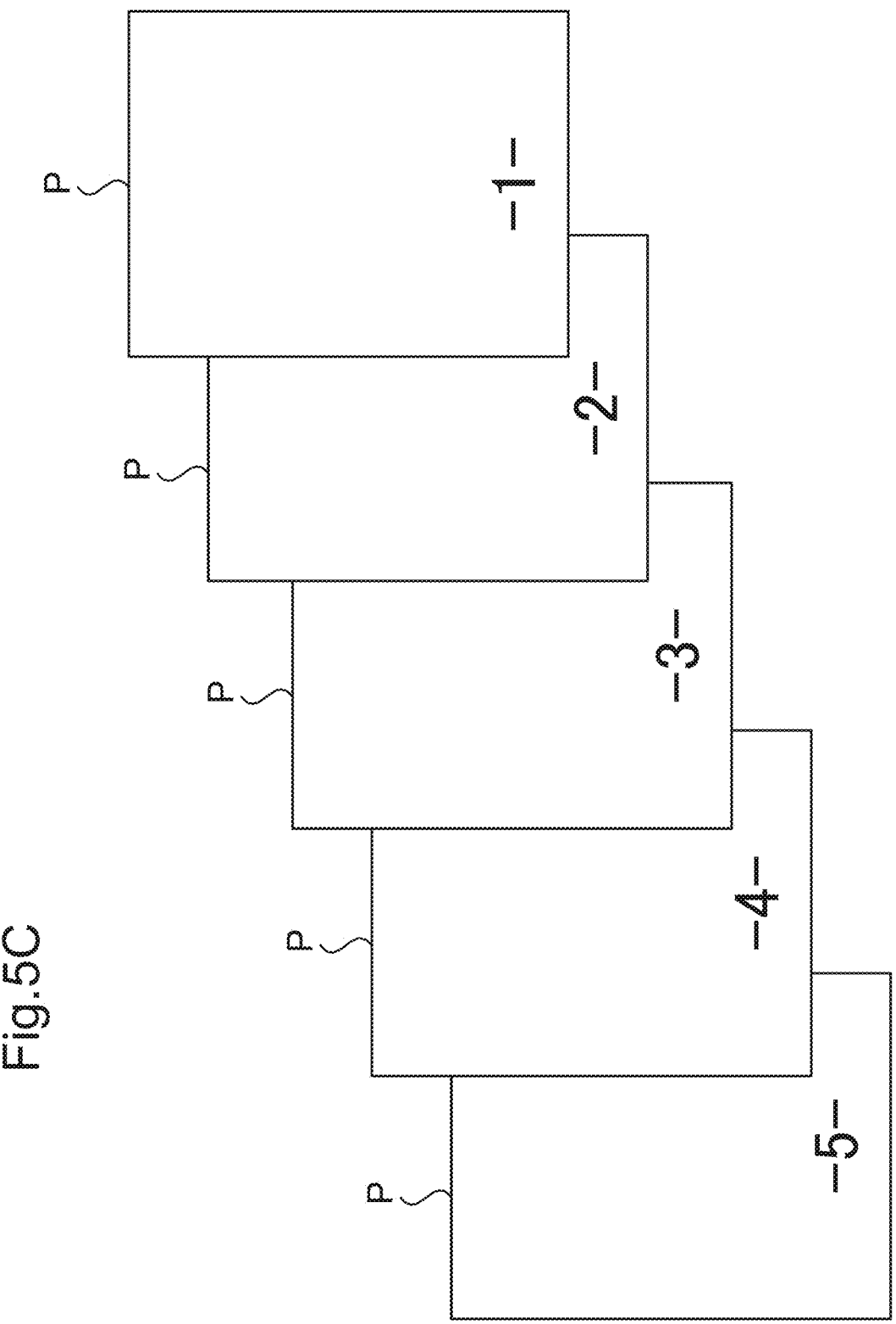

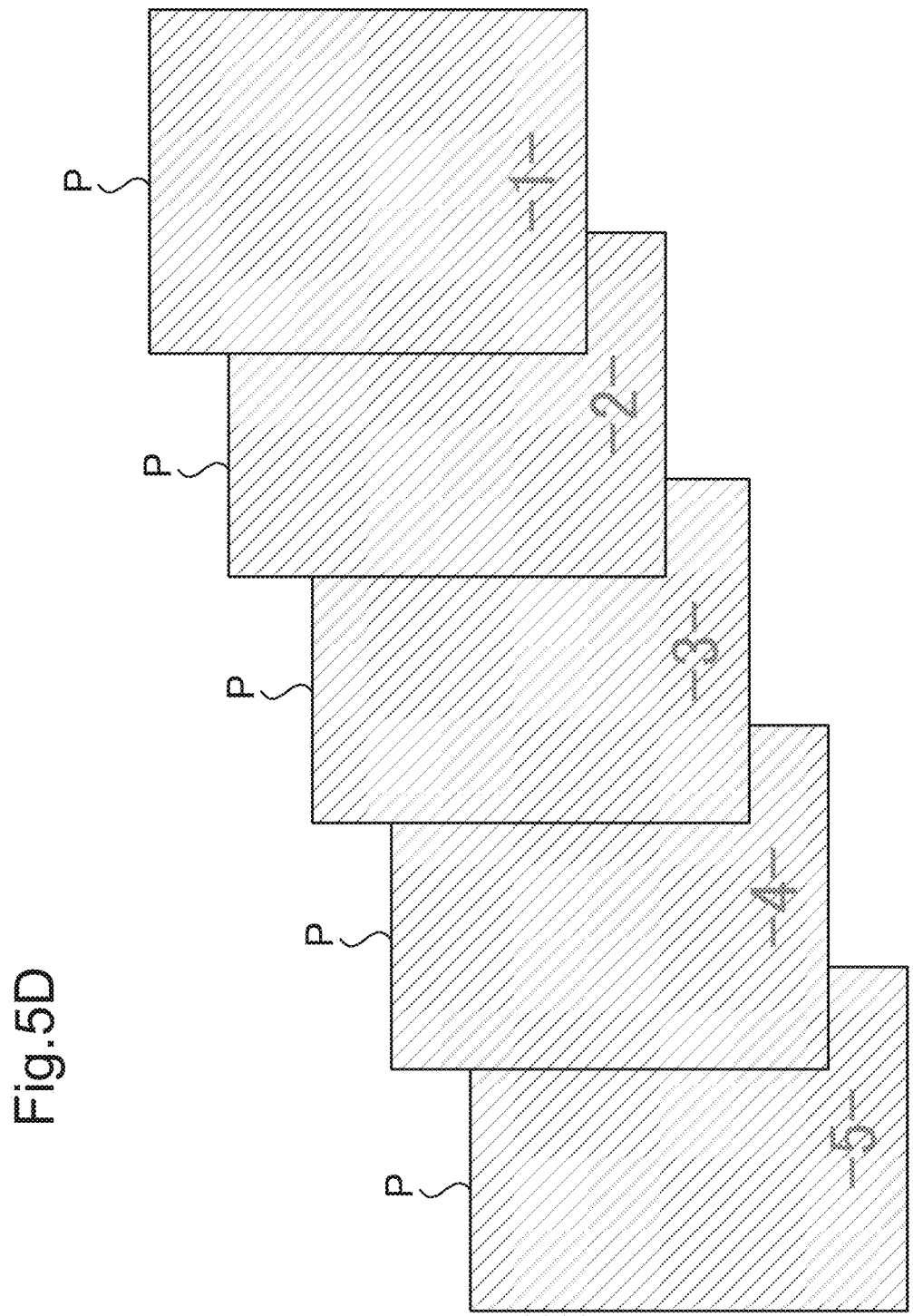

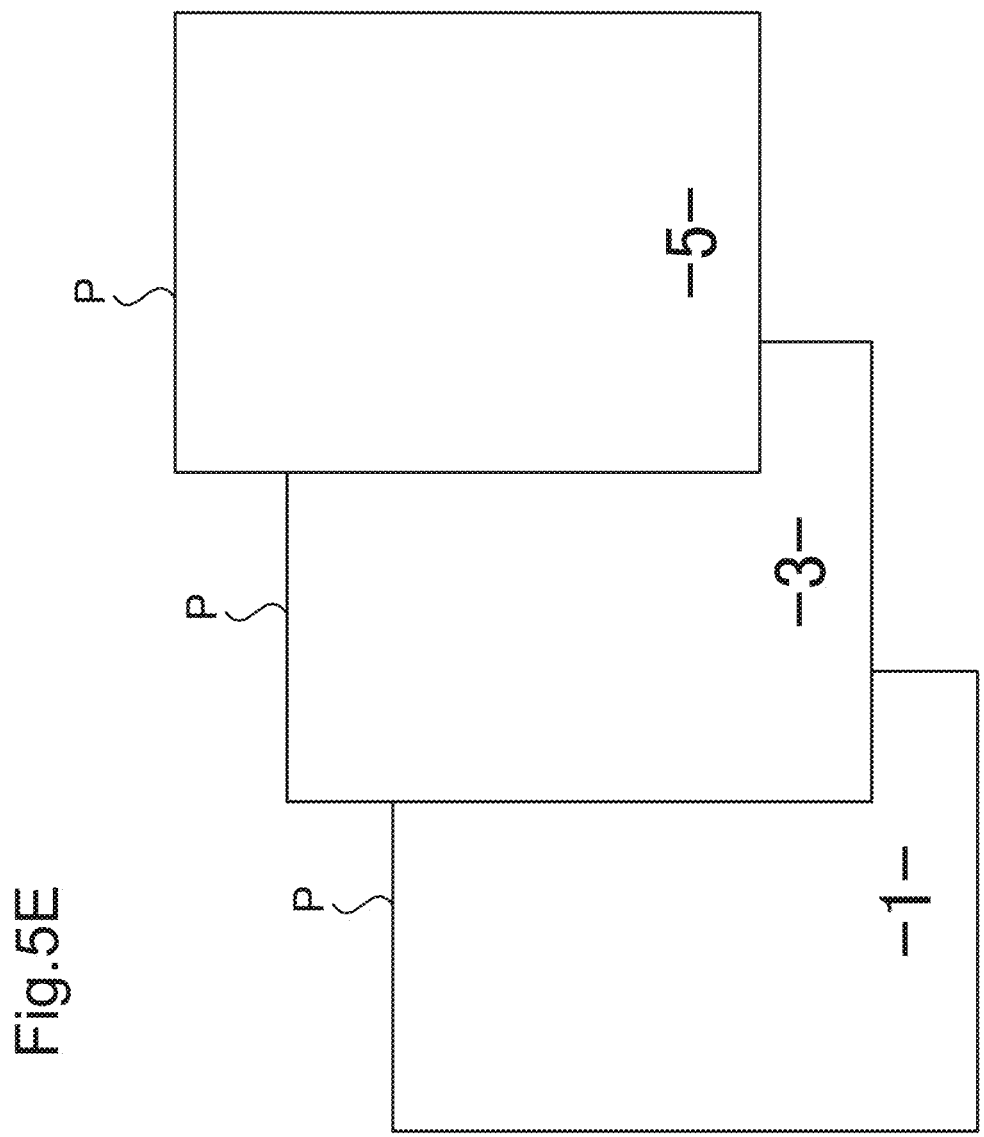

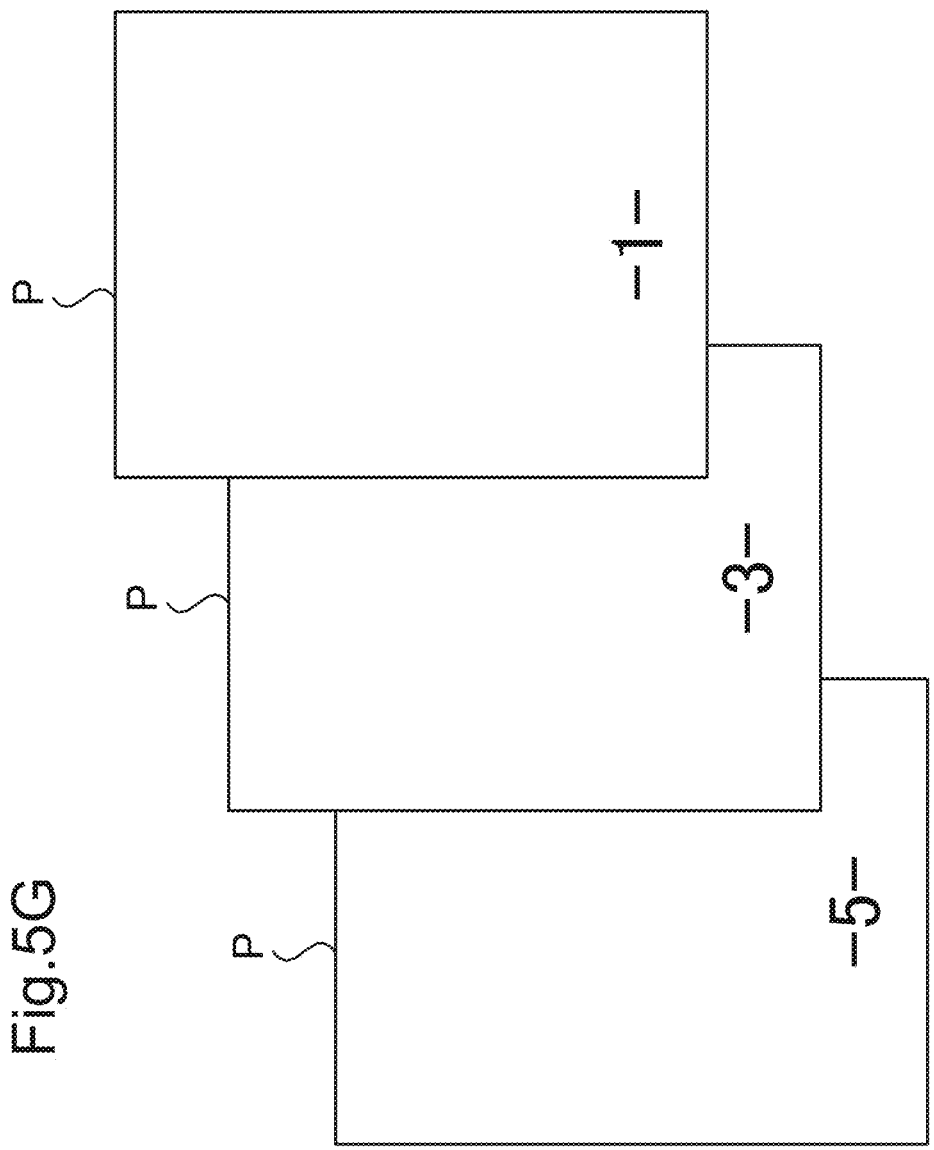

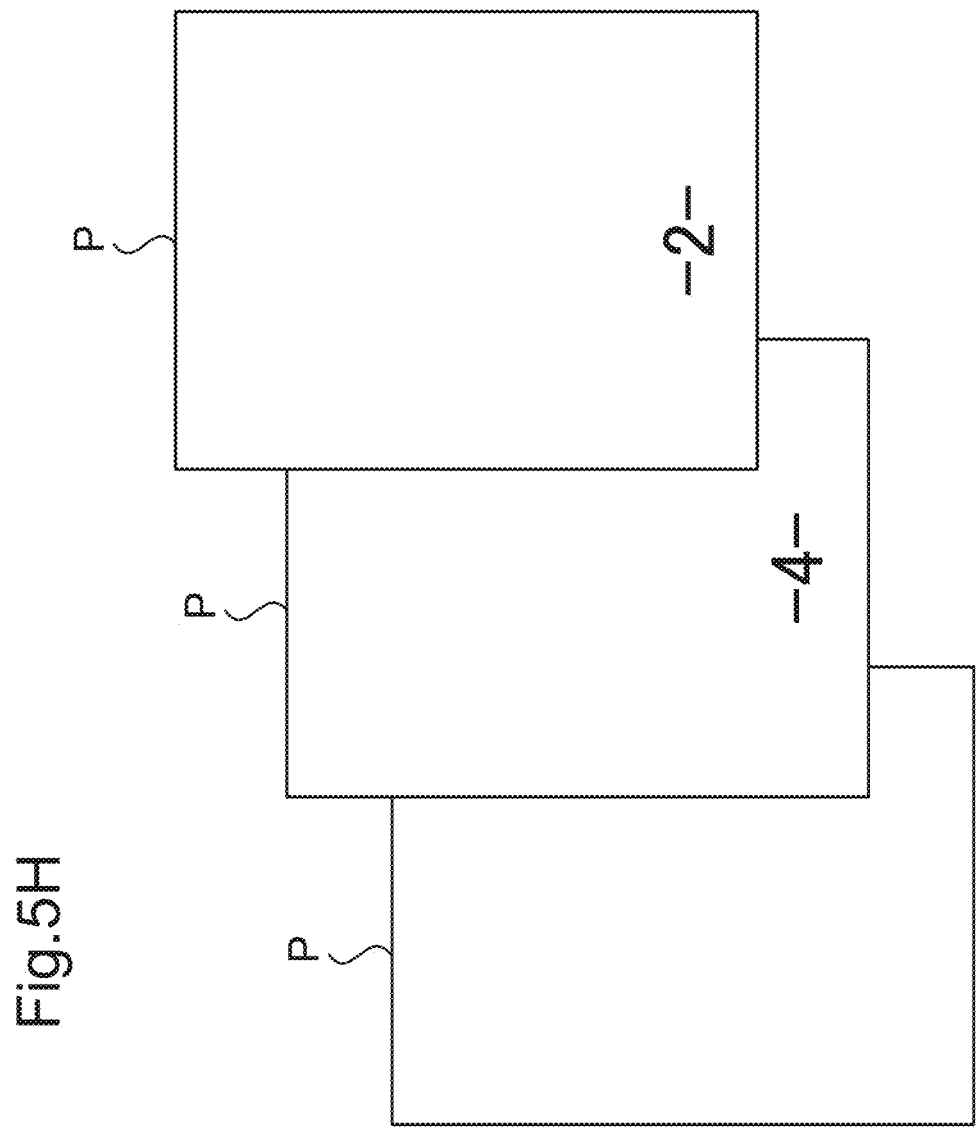

IMAGE FORMING SYSTEM THAT CHANGES ORDER OF RIP ACCORDING TO COMBINATION OF SORTING ORDER AND FACE ORIENTATION AT DELIVERY OF RECORDING MEDIUM HAVING IMAGE FORMED THEREON

INCORPORATION BY REFERENCE

This application claims priority to Japanese Patent Application No. 2022-055965 filed on Mar. 30, 2022, the entire contents of which are incorporated by reference herein.

BACKGROUND

The present disclosure relates to an image forming system, and in particular to a technique to adjust a sorting order and face orientation at delivery of a recording sheet having an image formed thereon.

Techniques to adjust a sorting order and face orientation at delivery of recording sheets, having an image formed thereon, are generally known. For example, a technique to be employed when face-down delivery is specified is known, including printing the images of all the pages in ascending order, on the first face of the recording sheets, when simplex printing is to be executed, and printing, when duplex printing is to be executed, the images of even-numbered pages in descending order, on the first face of the recording sheets, and printing the images of odd-numbered pages in descending order on the second face.

In addition, a technique to enable designation of the order of delivery and the face orientation at delivery, at the time of outputting, is known. Further, a technique is known for selecting either of a combination of forward-order printing and face-down delivery, and a combination of reverse-order printing and face-up delivery, on the basis of a setting direction and a binding position of source documents and the recording sheets.

SUMMARY

The disclosure proposes further improvement of the foregoing techniques.

In an aspect, the disclosure provides an image forming system including an input device, an image processing device, an image forming device, a delivery device, and a controller. The input device receives an input of an instruction from a user. The image processing device executes an RIP operation including generating a raster image by rasterizing print data represented by PDL data, with respect to each page. The image forming device forms an image on a recording medium. The delivery device includes a reversing mechanism that reverses the recording medium on which the image has been formed, and delivers the recording medium. The controller includes a processor, and causes, when the processor executes a control program, the image forming device to form the image represented by the raster image on the recording medium, with respect to each page, according to a generation order of the raster image, and causes the delivery device to deliver the recording medium without reversing, or to reverse the recording medium with the reversing mechanism and to deliver the recording medium, according to an instruction indicating face orientation at delivery, received through the input device. The controller causes the image processing device to execute the RIP operation in a forward order with respect to the print data, upon receipt, through the input device, of a first instruction indicating one of a combination of reverse order and face-up orientation, and a combination of forward order and face-down, as the combination of the sorting order and the face orientation at delivery of the recording medium on which the image has been formed, and causes the image processing device to execute the RIP operation in the reverse order with respect to the print data, upon receipt, through the input device, of a second instruction indicating one of a combination of forward order and face-up orientation, and a combination of reverse order and face-down, as the combination of the sorting order and the face orientation at delivery.

BRIEF DESCRIPTION OF THE DRAWINGS

FIG. 2 is a block diagram showing an internal configuration of the image forming apparatus and the delivery device;

FIG. 4 is a table for explaining details of the RIP order adjusting operation; and FIG. 5A to FIG. 5H are schematic drawings each showing an example of delivery status of recording sheets.

DETAILED DESCRIPTION

First Embodiment

Figure 1:
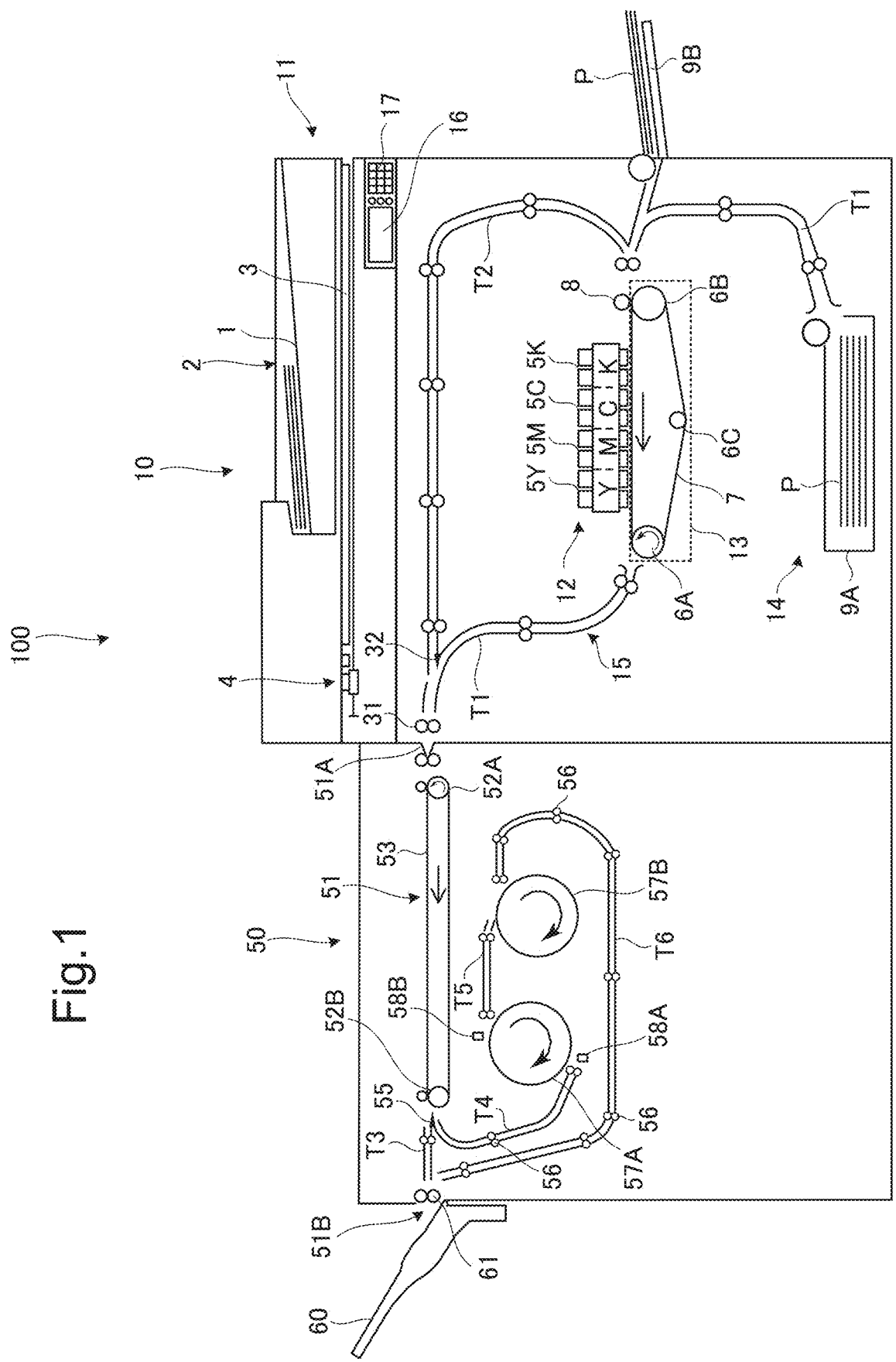
FIG. 1 is a cross-sectional view showing a structure of an image forming apparatus and a delivery device, constituting an image forming system.

Hereunder, a first embodiment of the disclosure will be described, with reference to the drawings. FIG. 1 is a cross-sectional view showing a structure of an image forming apparatus 10 and a delivery device 50, constituting an image forming system 100 according to the first embodiment of the disclosure. FIG. 2 is a block diagram showing an internal configuration of the image forming apparatus 10 and the delivery device 50.

As shown in FIG. 1, the image forming system 100 includes the image forming apparatus 10, and the delivery device 50 connected to the image forming apparatus 10. The image forming apparatus 10 forms an image on a recording sheet, an example of the recording medium in the disclosure. The delivery device 50 includes a reversing mechanism for reversing the recording sheet P transported from the image forming apparatus 10. The delivery device 50 delivers the recording sheet P.

[Configuration of Image Forming Apparatus 10]

As shown in FIG. 1, the image forming apparatus 10 is an ink jet recording apparatus. The image forming apparatus 10 includes an image reading device 11, an image forming device 12, a conveying unit 13, a paper feeding device 14, a transport mechanism 15, a display device 16, and an operation device 17.

The image reading device 11 is constituted as an automatic document feeder (ADF), including a document feeding device 2 that transports a source document placed on a document tray 1, and a scanner 4 that optically reads the source document transported by the document feeding device 2, or placed on a platen glass 3. The image reading device 11 emits light to the source document from a light emitter of the scanner 4, and receives the reflected light with a charge-coupled device (CCD) sensor, to thereby read the source document and generate image data representing the source image.

The image forming device 12 includes line heads 5Y, 5M, 5C, and 5K, respectively corresponding to yellow, magenta, cyan, and black colors. The image forming device 12 ejects ink droplets of the respective colors from the line heads 5Y, 5M, 5C, and 5K, onto a recording sheet P transported by the conveying unit 13, according to the image data generated by the image reading device 11, thereby forming a color image.

The conveying unit 13 includes a drive roller 6A, a follower roller 6B, a tension roller 6C, a transport belt 7, and an adsorption roller 8. The drive roller 6A is connected to a drive motor. The drive roller 6A is driven by the drive motor, to rotate counterclockwise. The transport belt 7 is an endless belt stretched around the drive roller 6A, the follower roller 6B, and the tension roller 6C.

The transport belt 7 rotates counterclockwise, so as to follow up the rotation of the drive roller 6A. The follower roller 6B and the tension roller 6C rotate counterclockwise, so as to follow up the rotation of the transport belt 7. The adsorption roller 8 is opposed to the follower roller 6B, in contact with the transport belt 7. The adsorption roller 8 electrically charges the transport belt 7, to thereby electrostatically adsorb the recording sheet P delivered from the paper feeding device 14, to the transport belt 7.

The paper feeding device 14 includes a paper cassette 9A and a manual bypass tray 9B. The paper feeding device 14 draws out the recording sheets P stored in the paper cassette 9A or the manual bypass tray 9B one by one, with a pickup roller rotated by a paper feeding motor, and delivers the recording sheet P to the transport route T1.

The transport mechanism 15 includes a delivery roller pair 31, a transport route T1 extending from the paper feeding device 14 to the delivery roller pair 31 via the conveying unit 13, a transport route T2 formed between the delivery roller pair 31 and the conveying unit 13, a plurality of transport roller pairs provided on the transport route T1 and the transport route T2, a branch guide 32 provided at the branch point between the transport route T1 and the transport route T2, a transport motor, and an actuator.

The transport mechanism 15 causes the transport roller pair and the delivery roller pair 31 to rotate, by driving the transport motor, thereby transporting the recording sheet P along the transport route T1 or the transport route T2. The branch guide 32 is made to switch the position by being driven by the actuator, so as to guide the recording sheet P transported along the transport route T1 to the delivery roller pair 31, or guide the recording sheet P delivered from the delivery device 50 to the transport route T2.

The display device 16 is constituted of, for example, a liquid crystal display (LCD) or an organic light-emitting diode (OLED) display. The display device 16 displays various types of screens related to the functions that the image forming apparatus 10 is configured to perform.

The operation device 17 includes a plurality of hard keys, such as a start key for instructing the start of various operations, relevant to the functions that the image forming apparatus 10 is configured to perform. The operation device 17 also includes a touch panel overlaid on the display device 16. The user can input, through the operation device 17, various types of information, such as the instruction relevant to the functions that the image forming apparatus 10 is configured to perform.

As shown in FIG. 2, the image forming apparatus 10 further includes a control device 18, a storage device 20, an image processing device 21, an image memory 22, a communication device 23, and an interface (I/F) 24. The control device 18 includes a processor, a random-access memory (RAM), and a read-only memory (ROM). The processor is, for example, a central processing device (CPU), a micro processing device (MPU), or an application specific integrated circuit (ASIC).

The control device 18 is electrically connected to the image reading device 11, the image forming device 12, the conveying unit 13, the paper feeding device 14, the transport mechanism 15, the display device 16, the operation device 17, the storage device 20, the image processing device 21, the image memory 22, the communication device 23, and the I/F 24.

The control device 18 acts as a controller 19, when the processor executes a control program stored in the ROM or the storage device 20. Here, the controller 19 may be constituted in the form of a logic circuit, instead of being realized by the operation according to the control program. The controller 19 controls the operation of each component of the image forming apparatus 10.

The storage device 20 is a large-capacity memory unit such as a solid state drive (SSD) or a hard disk drive (HDD). The storage device 20 stores therein various types of data, and various control programs for realizing the basic functions of the image forming apparatus 10. The storage device 20 contains, as an example of the control programs, an adjustment program for executing a raster image processing (RIP) order adjusting operation, according to this embodiment.

The image processing device 21 executes image processing as necessary, with respect to the image data generated by the image reading device 11. The image processing device 21 also includes a raster image processor. The image processing device 21 executes the RIP operation including rasterizing the print data represented by page description language (PDL) data, and generating the raster image with respect to each page. The image processing device 21 stores the raster image of each page generated as above, in the image memory 22.

The communication device 23 includes a communication module such as a local area network (LAN) board. The image forming apparatus 10 can perform data communication, for example with an external device, such as a PC 25 connected via the network, through the communication device 23. The communication device 23 exemplifies the input device in the disclosure.

To the I/F 24, the delivery device 50 is connected. The I/F 24 includes a plurality of terminals for electrical connection to the delivery device 50.

A power source is provided for each of the components of the image forming apparatus 10, so that those components are activated with the poser from the power source.

In this embodiment, the controller 19 of the image forming apparatus 10 causes, by operating according to the adjustment program, the image processing device 21 to execute the RIP operation in forward order, with respect to the print data represented by the PDL data, upon receipt, through the communication device 23, of the PDL data indicating one of a combination of reverse order and face-up, and a combination of forward order and face-down, as the combination of the sorting order and the face orientation at delivery of the recording sheet P on which the image has been formed. In addition, the controller 19 executes the RIP order adjusting operation, including causing the image processing device 21 to execute the RIP operation in the reverse order, with respect to the print data represented by the PDL data, upon receipt, through the communication device 23, of the PDL data indicating one of a combination of forward order and face-up, and a combination of reverse order and face-down.

[Configuration of Delivery Device 50]

As shown in FIG. 1, the delivery device 50 includes a casing, having a sheet inlet 51A formed on a first side face on the side of the image forming apparatus 10, and a delivery port 51B formed on a second side face on the opposite side of the first side face. On the second side face of the casing, an output tray 60 is provided, at position under the delivery port 51B.

The delivery device 50 includes, inside the casing, a delivery roller pair 61, a conveying unit 51, a branch guide 55, transport routes T3 to T6, a plurality of transport roller pairs 56, rotary drums 57A and 57B, and sensors 58A and 58B. The transport routes T4 to T6, the branch guide 55, the transport roller pair 56 on the transport routes T4 to T6, the rotary drums 57A and 57B, and the sensor 58B constitute the reversing mechanism.

The delivery roller pair 61 is driven by a motor of the drive device 62 to rotate, to thereby deliver the recording sheet P to the output tray 60, through the delivery port 51B.

The conveying unit 51 includes a drive roller 52A, a follower roller 52B, and a transport belt 53. The drive roller 52A is s driven by a motor of the drive device 62, so as to rotate. The transport belt 53 is an endless belt stretched around the drive roller 52A and the follower roller 52B. The transport belt 53 is made to rotate by the rotation of the drive roller 52A. The follower roller 52B rotates so as to follow up the rotation of the transport belt 53.

The branch guide 55 is located at the branch point between the transport route T3 and the transport route T4. The branch guide 55 is made to switch the position by being driven by an actuator of the drive device 62, so as to guide the recording sheet P transported by the conveying unit 51, to the transport route T3 or the transport route T4.

The transport route T3 extends from the follower roller 52B to the delivery roller pair 61. The transport route T4 extends from the follower roller 52B to a position on the lower side of the rotary drum 57A. The transport route T5 extends from a position on the upper side of the rotary drum 57A, to a position on the upper side of the rotary drum 57B. The transport route T6 extends from the position on the upper side of the rotary drum 57B, to the delivery roller pair 61.

The plurality of transport roller pairs 56 are located along the transport routes T3 to T6. The plurality of transport roller pairs 56 are each driven to rotate by a motor of the drive device 62.

The rotary drums 57A and 57B are located side by side on the lower side of the conveying unit 51, such that the respective axial lines of the rotary drums 57A and 57B become parallel to the axial line of the drive roller 52A. The rotary drums 57A and 57B are driven to rotate by a motor of the drive device 62.

The sensor 58A is located close to an end portion of the transport route T4 on the side of the rotary drum 57A. The sensor 58B is located close to an end portion of the transport route T5 on the side of the rotary drum 57A. The sensors 58A and 58B each detect whether the recording sheet P is present, at a predetermined position on the rotary drum 57A. Although the type of the sensors 58A and 58B is not specifically limited, a reflective photo sensor or a transmissive photo sensor is generally employed. The sensors 58A and 58B each output an ON signal upon detecting the recording sheet P, and outputs an OFF signal when the recording sheet P is undetected.

As shown in FIG. 2, the delivery device 50 also includes a control device 70, the drive device 62, a storage device 63, and an I/F 64. The control device 70 includes a processor, a RAM, and a ROM. The processor is, for example, a CPU, an MPU, or an ASIC. The control device 70 is electrically connected to the drive device 62, the storage device 63, the I/F 64, and the sensors 58A and 58B.

The control device 70 acts as a controller 65, when the processor executes a control program stored in the ROM or the storage device 63. Here, the controller 65 may be constituted in the form of a logic circuit, instead of being realized by the operation according to the control program. The controller 65 controls the operation of each component of the delivery device 50.

The drive device 62 includes a plurality of motors, respectively connected to the drive roller 52A, the transport roller pair 56, the rotary drum 57A and 57B, and the delivery roller pair 61. The drive device 62 causes the drive roller 52A, the transport roller pair 56, the rotary drums 57A and 57B, and the delivery roller pair 61 to rotate, by driving the corresponding motors. The drive device 62 also includes the actuator connected to the branch guide 55. The drive device 62 drives the actuator, to thereby switch the position of the branch guide 55.

The storage device 63 is a large-capacity memory unit such as an SSD or an HDD. The storage device 63 stores therein various types of data, and various control programs for realizing the basic functions of the delivery device 50.

To the I/F 64, the image forming apparatus 10 is connected. The I/F 64 includes a plurality of terminals for electrical connection to the image forming apparatus 10.

A power source is provided for each of the components of the delivery device 50, so that those components are activated with the poser from the power source.

[Operation]

Referring first to FIG. 1 and FIG. 2, the operation of the image forming system 100, performed when executing simplex printing, duplex printing, non-reversing delivery, and reversed delivery, will be described hereunder. In the operation described hereunder, the image forming device 12 forms an image represented by a raster image generated by the image processing device 21, on the recording sheet P.

[Operation for Simplex Printing]

When executing the simplex printing, the controller 19 of the image forming apparatus 10 causes the image forming device 12 to form the image represented by the raster image, on the upper face (in this case, first face) of the recording sheet P transported by the conveying unit 13, according to the order of generation of the raster image, by the image processing device 21.

In the case where a plurality of pages of raster images are to be generated, the controller 19 causes the image forming device 12 to sequentially form the images represented by the respective raster images, without standing by for the completion of the generation of the raster images of all the pages. The controller 19 also deletes the raster image from the image memory 22, each time the image formation of that raster image is finished.

The controller 19 causes the transport roller pair on the transport route T1 to rotate in a predetermined direction, by driving the transport motor of the transport mechanism 15, and switches the position of the branch guide 32 so as to guide the recording sheet P toward the delivery roller pair 31, by driving the actuator of the transport mechanism 15. Thus, the controller 19 causes the transport mechanism 15 to transport the recording sheet P, having the image formed on the upper face (in this case, first face) thereof, along the transport route T1. Then the controller 19 causes the delivery roller pair 31 to deliver the recording sheet P to the delivery device 50.

At this point, the controller 19 transmits a first signal requesting to execute the non-reversing delivery, in other words to deliver the recording sheet P without reversing, or a second signal requesting to execute the reversed delivery, in other words to deliver the recording sheet P in a reversed orientation, to the delivery device 50 through the I/F 24.

[Operation for Duplex Printing]

When executing the duplex printing, the controller 19 of the image forming apparatus 10 causes the image forming device 12 to form the image, for example represented by a first raster image according to the order of generation of the raster image by the image processing device 21, on the upper face (in this case, first face) of the recording sheet P transported by the conveying unit 13. The controller 19 causes the transport mechanism 15 to transport the recording sheet P, having the image formed on the upper face (in this case, first face) thereof, toward the delivery device 50 along the transport route T1, and causes the delivery roller pair 31 to deliver the recording sheet P to the delivery device 50. At this point, the controller 19 transmits a third signal requesting to return the recording sheet P, to the delivery device 50 through the I/F 24.

Upon receipt of the third signal through the I/F 64, the controller 65 of the delivery device 50 causes the drive roller 52A, and the transport roller pair 56 on the transport route T4 to rotate in a predetermined direction, by driving the motor of the drive device 62, and causes the rotary drum 57A to rotate counterclockwise. The controller 65 also switches the position of the branch guide 55 so as to guide the recording sheet P to the transport route T4, by driving the actuator of the drive device 62.

Accordingly, the recording sheet P, delivered from the image forming apparatus 10 through the sheet inlet 51A, is transported by the transport belt 53 toward the follower roller 52B, and then guided to the transport route T4 by the branch guide 55. The recording sheet P guided to the transport route T4 is transported by the transport roller pair 56 on the transport route T4, to be picked up by the rotary drum 57A.

When the sensor 58A detects the trailing edge of the recording sheet P picked up by the rotary drum 57A, the controller 65 causes the drive roller 52A, and the transport roller pair 56 on the transport route T4 to rotate in the direction opposite to the predetermined direction, and causes the rotary drum 57A to rotate clockwise, by controlling the motor of the drive device 62. As result, the recording sheet P picked up by the rotary drum 57A is transported by the transport roller pair 56 toward the conveying unit 51 along the transport route T4, and guided to the conveying unit 51 by the branch guide 55. The recording sheet P guided to the conveying unit 51 is transported by the transport belt 53 toward the sheet inlet 51A, and then delivered to the image forming apparatus 10, through the sheet inlet 51A.

After transmitting the third signal, the controller 19 of the image forming apparatus 10 causes the transport roller pair on the transport route T2 to rotate in the predetermined direction, by driving the transport motor of the transport mechanism 15, and switches the position of the branch guide 32, so as to guide the recording sheet P to the transport route T2, by driving the actuator of the transport mechanism 15. Therefore, the recording sheet P transported from the delivery device 50 is guided to the transport route T2 by the branch guide 32, and transported toward the conveying unit 13 along the transport route T2. In this case, the recording sheet P is transported to the conveying unit 13, with upper and lower faces reversed.

The controller 19 causes the image forming device 12 to form the image represented by a second raster image, according to the order of generation of the raster image by the image processing device 21, on the upper face (in this case, second face) of the recording sheet P transported by the conveying unit 13. The controller 19 then causes the transport mechanism 15 to transport the recording sheet P, having the image formed on the upper face (second face) thereof, along the transport route T1, and causes the delivery roller pair 31 to deliver the recording sheet P to the delivery device 50. At this point, the controller 19 transmits the first signal or the second signal, to the delivery device 50 through the I/F 24.

[Operation for Non-Reversing Delivery]

Upon receipt of the first signal through the I/F 64, the controller 65 of the delivery device 50 causes the drive roller 52A, the transport roller pair 56 on the transport route T3, and the delivery roller pair 61 to rotate in the predetermined direction, by driving the motor and the actuator of the drive device 62, and switches the position of the branch guide 55, so as to guide the recording sheet P to the transport route T3.

Accordingly, the recording sheet P, delivered from the image forming apparatus 10 through the sheet inlet 51A, is transported by the transport belt 53 toward the follower roller 52B, and guided to the transport route T3 by the branch guide 55. The recording sheet P guided to the transport route T3 is transported along the transport route T3 by the transport roller pair 56, and then delivered to the output tray 60 by the delivery roller pair 61, through the delivery port 51B.

[Operation for Reversed Delivery]

Upon receipt of the second signal through the I/F 64, the controller 65 of the delivery device 50 causes the drive roller 52A and the transport roller pair 56 on the transport route T4 to rotate in the predetermined direction, and causes the rotary drum 57A to rotate counterclockwise, by driving the motor of the drive device 62. The controller 65 also switches the position of the branch guide 55 so as to guide the recording sheet P to the transport route T4, by driving the actuator of the drive device 62.

Accordingly, the recording sheet P, delivered from the image forming apparatus 10 through the sheet inlet 51A, is transported by the transport belt 53 toward the follower roller 52B, and guided to the transport route T4 by the branch guide 55. The recording sheet P guided to the transport route T4 is transported along the transport route T4 by the transport roller pair 56, and then picked up by the rotary drum 57A.

When the sensor 58B detects the trailing edge of the recording sheet P on the rotary drum 57A, the controller 65 causes the transport roller pairs 56 on the transport routes T5 and T6, and the delivery roller pair 61 to rotate in the predetermined direction, and causes the rotary drums 57A and 57B to rotate clockwise, by controlling the motor of the drive device 62. As result, the recording sheet P picked up by the rotary drum 57A is transported by the transport roller pair 56 on the transport route T5 toward the rotary drum 57B along the transport route T5, and picked up by the rotary drum 57B. The recording sheet P picked up by the rotary drum 57B is transported along the transport route T6 by the transport roller pair 56 on the transport route T6, and delivered to the output tray 60 by the delivery roller pair 61 through the delivery port 51B, with the upper and lower faces reversed.

[Operation for RIP Order Adjusting Operation]

Figure 3A:
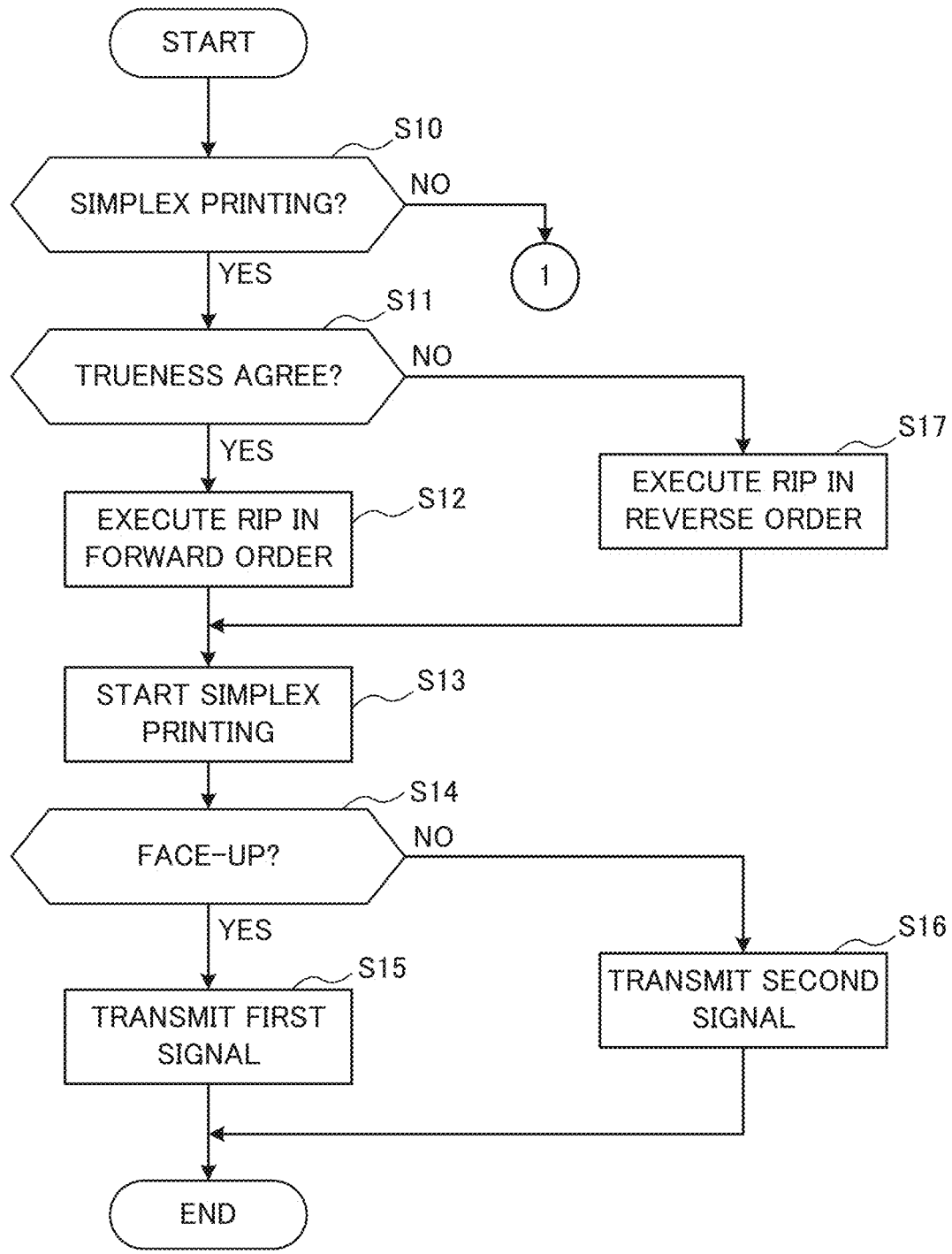
FIG. 3A to FIG. 3C are flowcharts for explaining an RIP order adjusting operation.
Figure 3B:
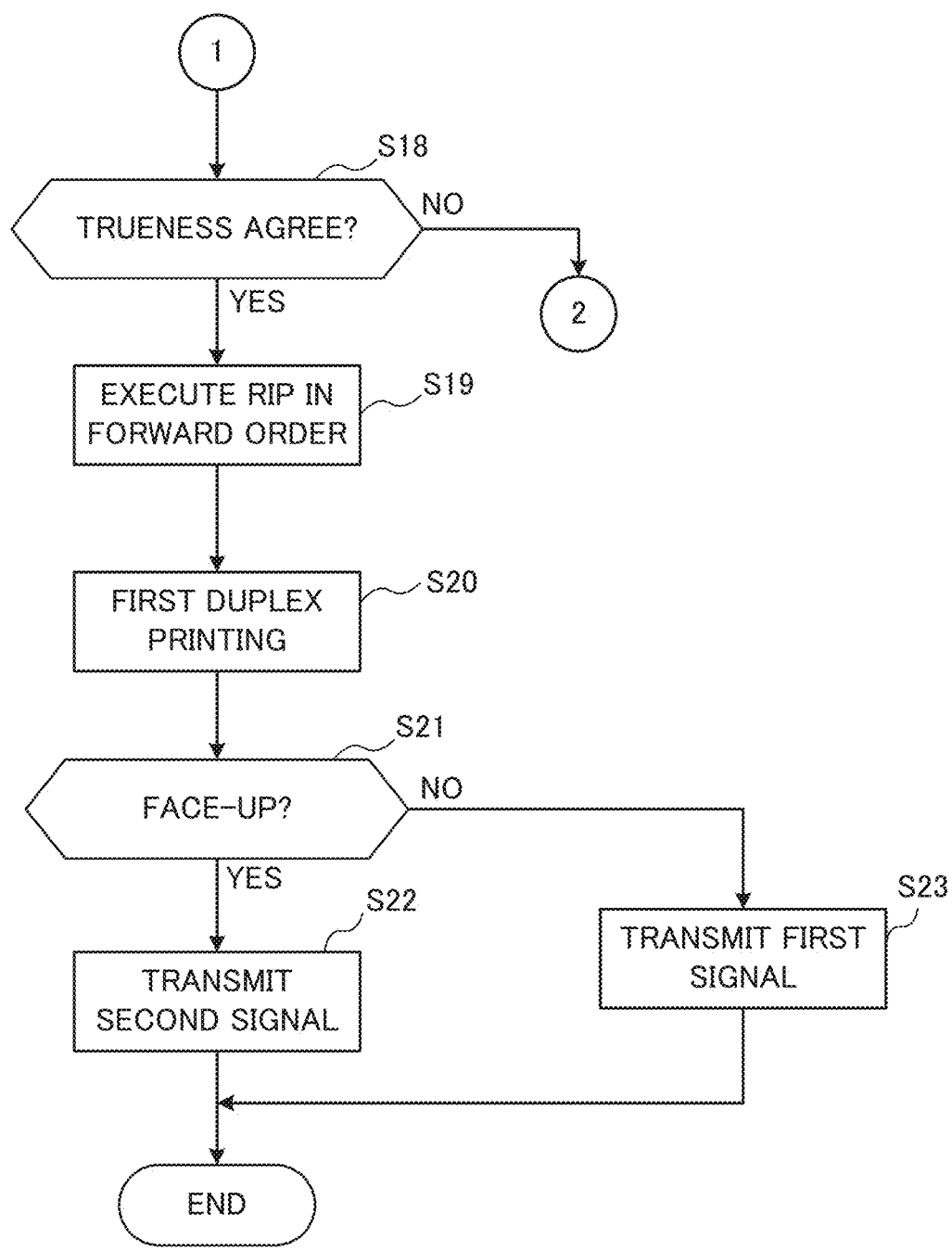
Figure 3C:
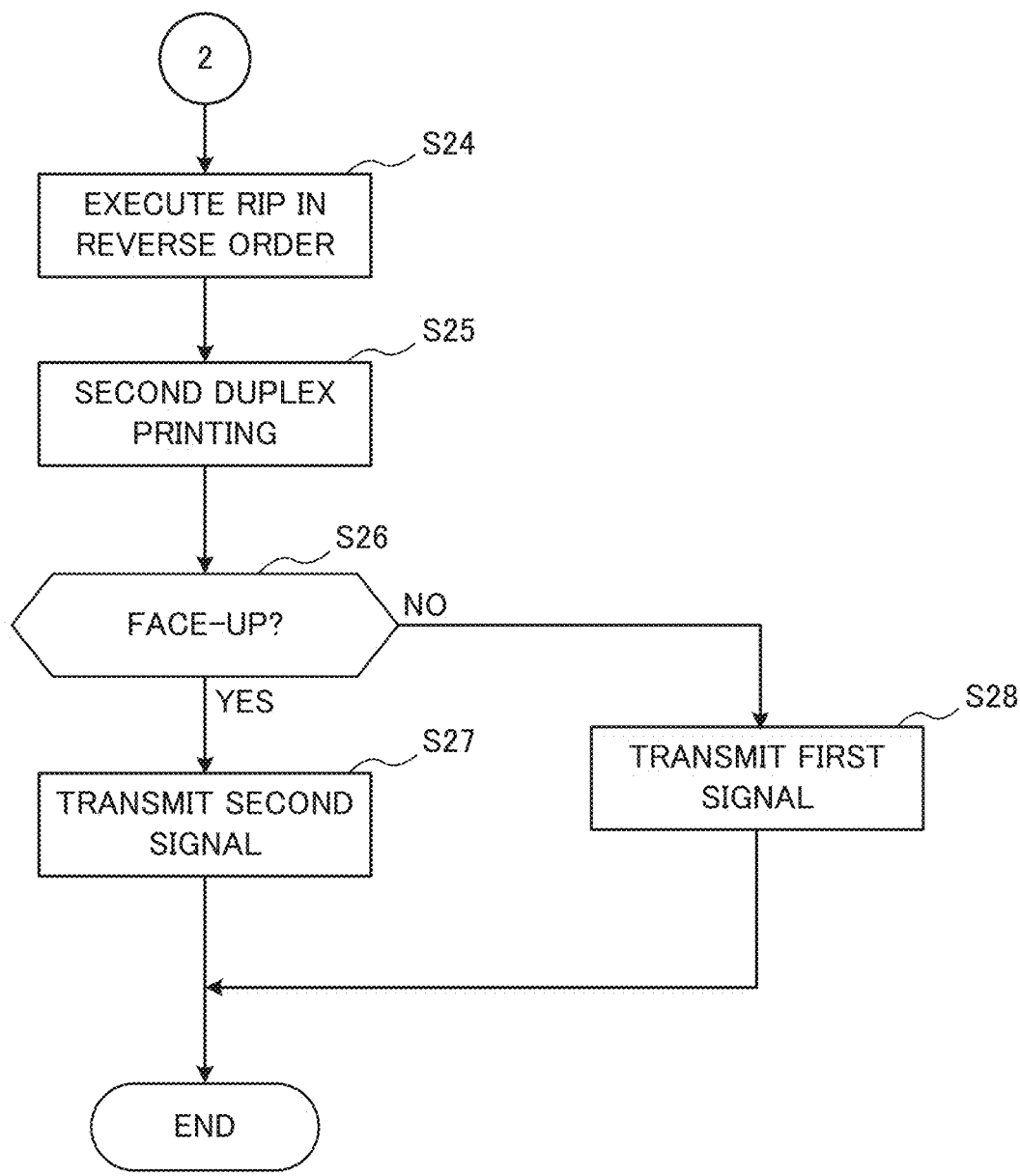

FIG. 3A to FIG. 3C are flowcharts for explaining the RIP order adjusting operation. FIG. 4 is a table for explaining details of the RIP order adjusting operation. FIG. 5A to FIG. 5H are schematic drawings each showing the status of the recording sheets delivered to the output tray 60. Referring to FIG. 3A to FIG. 5H, the operation of the image forming system 100, performed when executing the RIP order adjusting operation, will be described hereunder.

For the following description, it will be assumed that plain paper is employed as the recording sheet P, when the simplex printing is to be executed, and a single-sided glossy paper, only a first face of which is glossy, is employed as the recording sheet P, when the duplex printing is to be executed. In FIG. 5A to FIG. 5D, the hatched faces represent the second faces on which the image has not been formed.

It is assumed here that, for example, the user designates, through the PC 25, the image data of the portable document format (PDF) representing images of the first to fifth pages, and inputs a printing instruction specifying, as print setting, one of the simplex printing and duplex printing, one of forward order and reverse order indicating the sorting order of the recording sheet P, and one of face-down and face-up, indicating the face orientation at delivery.

Upon receipt of the printing instruction, the controller of the PC 25 generates the PDL data indicating the designated image data and the print setting, using a printer driver stored in the storage device of the PC 25, and transmits the generated PDL data to the image forming apparatus 10, through the communication device of the PC 25.

Upon receipt of the PDL data through the communication device 23, the controller 19 of the image forming apparatus 10 starts to execute the RIP order adjusting operation shown in FIG. 3A to FIG. 3C. In the RIP order adjusting operation, first, the controller 19 decides whether the PDL data is indicating the simplex printing (step S10).

(1) When Simplex Printing is Designated

Upon deciding that the PDL data is indicating the simplex printing (YES at step S10), the controller 19 decides whether trueness agrees with each other, on the basis of a combination of sorting order and face orientation at delivery indicated by the PDL data (step S11). Here, it is assumed that the controller 19 defines in advance, with respect to the sorting order, the forward order as "true" and the reverse order as "false". The controller 19 also defines in advance, with respect to the face orientation at delivery, the face-down orientation as "true" and the face-up orientation as "false".

(1-1) When Combination of Reverse Order and Face-Up is Designated

When the combination of sorting order and face orientation at delivery indicated by the PDL data is the reverse order which is "false", and the face-up orientation which is also "false", the controller 19 decides that the trueness agrees with each other (YES at step S11), and causes the image processing device 21 to start to execute the RIP operation, as shown in a table 40 of FIG. 4, in forward order (in this case, in the order from the first page to the fifth page) with respect to the print data indicated by the PDL data (step S12).

After step S12, the controller 19 causes the image forming device 12 to start to execute the simplex printing (step S13). In the simplex printing of this example, the controller 19 causes the image forming device 12 to form the image represented by the raster image on the upper face (in this case, first face) of the recording sheets P, sequentially transported by the conveying unit 13, according to the order of generation of the raster images (in this case, in the order from the first page to the fifth page).

After step S13, the controller 19 decides whether the PDL data is indicating the face-up orientation (step S14). In this example, the controller 19 decides that the PDL data is indicating the face-up orientation (YES at step S14), and transmits the first signal requesting to execute the non-reversing delivery, to the delivery device 50 through the I/F 24 (step S15). After step S15, the controller 19 finishes the RIP order adjusting operation.

Upon receipt of the first signal transmitted from the image forming apparatus 10, through the I/F 64, the controller 65 of the delivery device 50 executes the non-reversing delivery operation. Accordingly, as shown in FIG. 5A, the plurality of recording sheets P, sorted in reverse order (in this case, from the fifth to the first page) from the side of the leading page (uppermost page, in the case of face-up orientation), are delivered to the output tray 60 in the face-up orientation, with the printed image oriented upward.

(1-2) When Combination of Forward Order and Face-Down is Designated

When the combination of sorting order and face orientation at delivery indicated by the PDL data is the forward order which is "true" and the face-down orientation which is also "true", the controller 19 decides that the trueness agrees with each other (YES at step S11), and executes the operation of step S12 and step S13, as described above.

After step S13, the controller 19 decides that the PDL data is indicating the face-down orientation (NO at step S14), and transmits the second signal requesting to execute the reversed delivery, to the delivery device 50 through the I/F 24 (step S16). After step S16, the controller 19 finishes the RIP order adjusting operation.

Upon receipt of the second signal transmitted from the image forming apparatus 10, through the I/F 64, the controller 65 of the delivery device 50 executes the reversed delivery operation. Accordingly, as shown in FIG. 5B, the plurality of recording sheets P, sorted in forward order (in this case, from the first to the fifth page) from the side of the leading page (lowermost page, in the case of face-down orientation), are delivered to the output tray 60 in the face-down orientation, with the printed image oriented downward.

(1-3) When Combination of Forward Order and Face-Up is Designated

When the combination of sorting order and face orientation at delivery indicated by the PDL data is the forward order which is "true" and the face-up orientation which is "false", the controller 19 decides that the trueness does not agree with each other (NO at step S11), and causes the image processing device 21 to start to execute the RIP operation, as shown in the table 40, in reverse order (in this case, in the order from the fifth page to the first page) with respect to the print data indicated by the PDL data (step S17).

After step S17, the controller 19 executes the operation of step S13. In the simplex printing of this example, the controller 19 causes the image forming device 12 to form the image represented by the raster image on the upper face (in this case, first face) of the recording sheets P, sequentially transported by the conveying unit 13, according to the order of generation of the raster images (in this case, in the order from the fifth page to the first page).

After step S13, the controller 19 decides that the PDL data is indicating the face-up orientation (YES at step S14), and executes the operation of step S15. After step S15, the controller 19 finishes the RIP order adjusting operation.

Upon receipt of the first signal through the I/F 64, the controller 65 of the delivery device 50 executes the non-reversing delivery operation. Accordingly, as shown in FIG. 5C, the plurality of recording sheets P, sorted in forward order (in this case, from the first to the fifth page) from the side of the leading page (uppermost page, in the case of face-up orientation), are delivered to the output tray 60 in the face-up orientation, with the printed image oriented upward.

(1-4) When Combination of Reverse Order and Face-Down is Designated

When the combination of sorting order and face orientation at delivery indicated by the PDL data is the reverse order which is "false" and the face-down orientation which is "true", the controller 19 decides that the trueness does not agree with each other (NO at step S11), and executes the operation of step S17 and step S13 as described above.

After step S13, the controller 19 decides that the PDL data is indicating the face-down orientation (NO at step S14), and executes the operation of step S16. After step S16, the controller 19 finishes the RIP order adjusting operation.

Upon receipt of the second signal through the I/F 64, the controller 65 of the delivery device 50 executes the reversed delivery operation. Accordingly, as shown in FIG. 5D, the plurality of recording sheets P, sorted in reverse order (in this case, from the fifth to the first page) from the side of the leading page (lowermost page, in the case of face-down orientation), are delivered to the output tray 60 in the face-down orientation, with the printed image oriented downward.

(2) When Duplex Printing is Designated

Upon deciding that the PDL data is indicating the duplex printing (NO at step S10), the controller 19 decides whether the trueness agrees with each other, on the basis of the combination of sorting order and face orientation at delivery, indicated by the PDL data (step S18).

(2-1) When Combination of Reverse Order and Face-Up is Designated

The combination of sorting order and face orientation at delivery indicated by the PDL data is the reverse order which is "false" and the face-up orientation which is also "false", the controller 19 decides that the trueness agrees with each other (YES at step S18), and causes the image processing device 21 to start to execute the RIP operation, as shown in the table 40, in forward order (in this case, in the order from the first page to the fifth page) with respect to the print data indicated by the PDL data (step S19).

After step S19, the controller 19 causes the image forming device 12 to start to execute a first duplex printing (step S20). In the first duplex printing, the controller 19 causes the image forming device 12 to form the image represented by the raster image generated through an odd-numbered process on the first face, and the image represented by the raster image generated through an even-numbered process on the second face, of each of the recording sheets P sequentially transported by the conveying unit 13.

In this case, as shown in the table 40, the odd-numbered images (in this case, images of first page, third page, and fifth page) are formed in this order on the respective first faces, and the even-numbered images (in this case, images of second page and fourth page) are formed in this order on the respective second faces, of the first to third recording sheets P. Here, the second face of the third recording sheet P remains blank.

After step S20, the controller 19 decides whether the PDL data is indicating the face-up orientation (step S21). Upon deciding that the PDL data is indicating the face-up orientation (YES at step S21), the controller 19 transmits the second signal to the delivery device 50 through the I/F 24 (step S22). After step S22, the controller 19 finishes the RIP order adjusting operation.

Upon receipt of the second signal through the I/F 64, the controller 65 of the delivery device 50 executes the reversed delivery operation. Accordingly, as shown in FIG. 5E, the plurality of recording sheets P, on which the pages are sorted in reverse order (in this case, from the fifth to the first page) from the side of the leading page (uppermost page, in the case of face-up orientation), are delivered to the output tray 60 in the face-up orientation, with the first face, having the image of the odd-numbered page formed thereon, oriented upward.

(2-2) When Combination of Forward Order and Face-Down is Designated

When the combination of sorting order and face orientation at delivery indicated by the PDL data is the forward order which is "true" and the face-down orientation which is also "true", the controller 19 decides that the trueness agrees with each other (YES at step S18), and executes the operation of step S19 and step S20, as described above.

Upon deciding, after step S20, that the PDL data is indicating the face-down orientation (NO at step S21), the controller 19 transmits the first signal to the delivery device 50 through the I/F 24 (step S23). After step S23, the controller 19 finishes the RIP order adjusting operation.

Figure 5F:
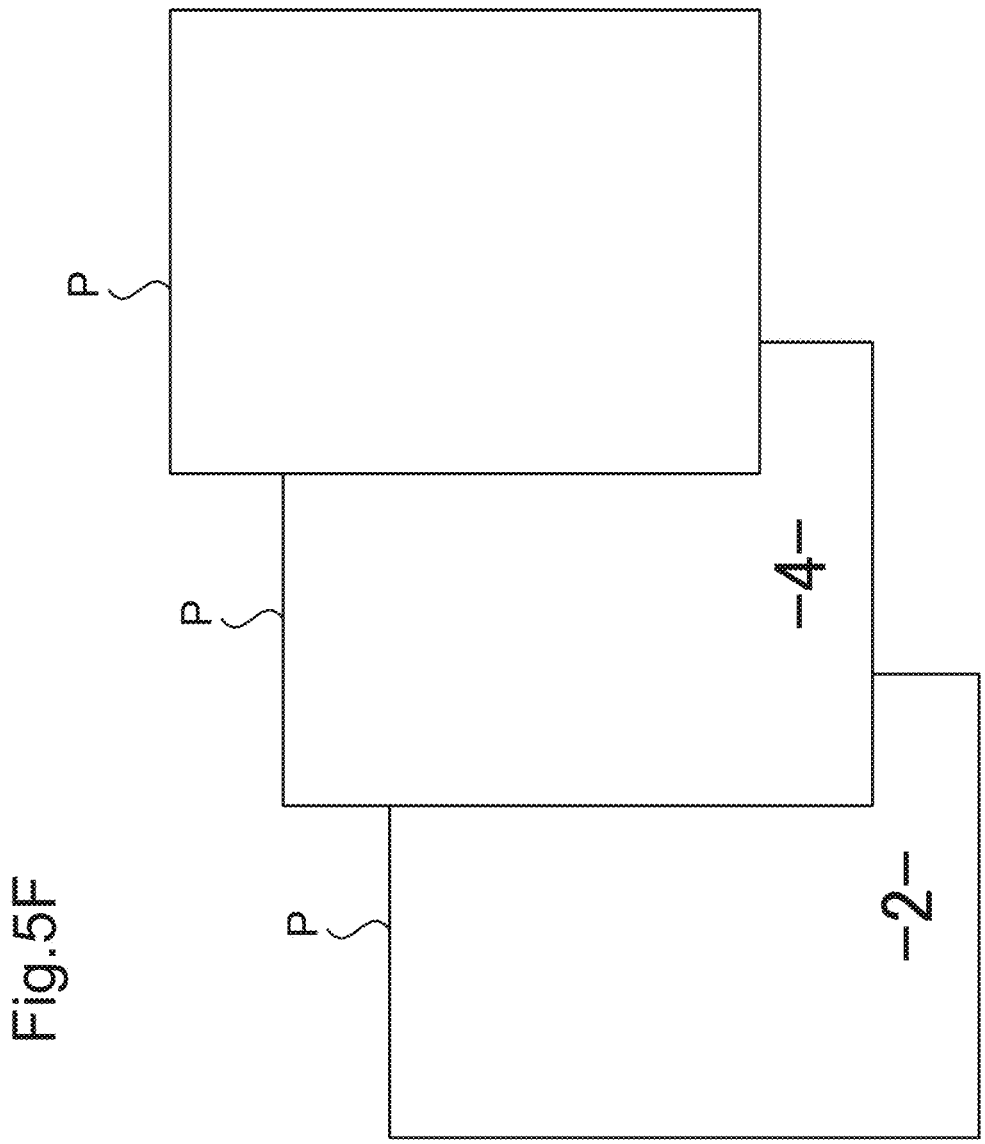

Upon receipt of the first signal through the I/F 64, the controller 65 of the delivery device 50 executes the non-reversing delivery operation. Accordingly, as shown in FIG. 5F, the plurality of recording sheets P, on which the pages are sorted in forward order (in this case, from the first to the fifth page) from the side of the leading page (lowermost page, in the case of face-down orientation), are delivered to the output tray 60 in the face-down orientation, with the first face, having the image of the odd-numbered page formed thereon, oriented downward.

(2-3) When Combination of Forward Order and Face-Up is Designated

When the combination of sorting order and face orientation at delivery indicated by the PDL data is the forward order which is "true" and the face-up orientation which is "false", the controller 19 decides that the trueness does not agree with each other (NO at step S18), and causes the image processing device 21 to start to execute the RIP operation, as shown in the table 40, in reverse order with respect to the print data indicated by the PDL data (step S24).

At this point, in the case where the print data consists of even pages, the controller 19 causes the image processing device 21 to execute the RIP operation only in reverse order. When the print data consists of odd pages, the controller 19 causes the image processing device 21 to execute the RIP operation in reverse order, along with insertion of a blank page at the leading position. In this case, the print data is indicating the fifth page, which is the odd-numbered page, and therefore the controller 19 causes the image processing device 21, as shown in the table 40, to generate the blank page as the first page, and then generate the raster images in the order from the fifth page to the first page.

After step S24, the controller 19 causes the image forming device 12 to start to execute a second duplex printing (step S25). In the second duplex printing, the controller 19 causes the image forming device 12 to form the image represented by the raster image generated through an even-numbered process on the first face, and the image represented by the raster image generated through an odd-numbered process on the second face, of each of the recording sheets P sequentially transported by the conveying unit 13.

In this case, as shown in the table 40, the even-numbered images (in this case, images of fifth page, third page, and first page) are formed in this order on the respective first faces, and the odd-numbered images (in this case, images of blank page, fourth page, and second page) are formed in this order on the respective second faces, of the first to third recording sheets P.

After step S25, the controller 19 decides whether the PDL data is indicating the face-up orientation (step S26). Upon deciding that the PDL data is indicating the face-up orientation (YES at step S26), the controller 19 transmits the second signal to the delivery device 50 through the I/F 24 (step S27). After step S27, the controller 19 finishes the RIP order adjusting operation.

Upon receipt of the second signal through the I/F 64, the controller 65 of the delivery device 50 executes the reversed delivery operation. Accordingly, as shown in FIG. 5G, three recording sheets P, on which the pages are sorted in forward order (in this case, from the first to the fifth page) from the side of the leading page (uppermost page, in the case of face-up orientation), are delivered to the output tray 60 in the face-up orientation, with the first face, having the image of the odd-numbered page formed thereon, oriented upward.

(2-4) When Combination of Reverse Order and Face-Down is Designated

When the combination of sorting order and face orientation at delivery indicated by the PDL data is the reverse order which is "false" and the face-down orientation which is "true", the controller 19 decides that the trueness does not agree with each other (NO at step S18), and executes the operation of step S24 and step S25, as described above.

Upon deciding, after step S25, that the PDL data is indicating the face-down orientation (NO at step S26), the controller 19 transmits the first signal to the delivery device 50 through the I/F 24 (step S28). After step S28, the controller 19 finishes the RIP order adjusting operation.

Upon receipt of the first signal through the I/F 64, the controller 65 of the delivery device 50 executes the non-reversing delivery operation. Accordingly, as shown in FIG. 5H, three recording sheets P, on which the pages are sorted generally in reverse order (in this case, fifth page, third page, fourth page, first page, and second page) from the side of the leading page (lowermost page, in the case of face-down orientation), are delivered to the output tray 60 in the face-down orientation, with the first face, having the image of the odd-numbered page formed thereon, oriented downward.

As described above, in the case where the combination of reverse order and face-down is designated to execute the duplex printing, the image of the odd-numbered page is formed on the first face (i.e., glossy face) of the recording sheet P, like the case where other combinations are designated, although the pages on the recording sheets P are not sorted in a perfect reverse order.

Now, with the aforementioned known technique, in the case where the recording sheets have to be delivered in reverse order, the print data is subjected to the RIP operation in forward order, and the printing is sequentially started from the last page, at the time that the RIP operation of the last page is finished. Accordingly, since the printing is unable to be started until the RIP operation of all the pages is finished, the time required for the printing is prolonged. In addition, the printing is started after the raster images of all the pages are stored in the image memory, and therefore the memory consumption is increased.

According to the foregoing embodiment, in contrast, the controller 19 causes the image processing device 21, upon receipt, through the communication device 23, of the PDL data indicating one of the combination of reverse order and face-up, and the combination of forward order and face-down, to execute the RIP operation in forward order, with respect to the print data indicated by the PDL data. In addition, the controller 19 causes the image processing device 21, upon receipt, through the communication device 23, of the PDL data indicating one of the combination of forward order and face-up, and the combination off reverse order and face-down, to execute the RIP operation in reverse order, with respect to the print data indicated by the PDL data.

As described above, when the recording sheets P have to be delivered in reverse order, the RIP operation is executed in reverse order, with respect to the print data. Accordingly, even when the recording sheets P have to be delivered in reverse order, the printing can be started sequentially, in the order of the generation of the pages, without the need to stand by for the completion of the RIP operation of all the pages. Therefore, the time required for the printing can be shortened, compared with the case where the printing is started after the RIP operation of all the pages is finished. In addition, since the raster images are sequentially deleted from the image memory, each time the printing of the corresponding raster image is finished, the increase in memory consumption can be suppressed, compared with the case where the printing is started after the raster images of all the pages are stored in the image memory.

According to the foregoing embodiment, when the image processing device 21 is executing the RIP operation in forward order, and the instruction to execute the duplex printing is received through the communication device 23, the controller 19 causes the image forming device 21 to form the odd-numbered image on the first page of the recording sheet P, and the even-numbered image on the second face of the recording sheet P. In addition, when the image processing device 21 is executing the RIP operation in reverse order, and the instruction to execute the duplex printing is received through the communication device 23, the controller 19 causes the image forming device 21 to form the even-numbered image on the first page of the recording sheet P, and the odd-numbered image on the second face of the recording sheet P.

Accordingly, whichever the order of the RIP operation is, the same images can be printed on the first face and the second face. In other words, the image to be formed on the first face can be correctly printed on the first face, and the image to be formed on the second face can be correctly printed on the second face. Therefore, even when the recording sheet P, the finish of which is different between the first face and the second face, is employed, such as a preprinted paper, a single-sided glossy paper, or a single-sided coated paper, a uniform finish quality can be attained.

According to the foregoing embodiment, when the PDL data, indicating the combination of sorting order and face orientation at delivery in which the trueness does not agree with each other, and the duplex printing, is received through the communication device 23, and the print data is indicating an odd-numbered page, the controller 19 causes the image processing device 21 to execute the RIP operation in reverse order, along with the insertion of a blank page at the leading position.

Therefore, even when the print data is indicating the odd-numbered page, a uniform finish quality can be surely attained, irrespective of the combination of sorting order and face orientation at delivery.

According to the foregoing embodiment, further, upon receipt, through the communication device 23, of the instruction to execute the duplex printing and the instruction to execute the face-up delivery, the controller 19 causes the delivery device 50 to execute the reversed delivery. In addition, upon receipt, through the communication device 23, of the instruction to execute the duplex printing and the instruction to execute the face-down delivery, the controller 19 causes the delivery device 50 to execute the non-reversing delivery.

Therefore, the user can surely acquire the printed materials, in the desired combination of sorting order and face orientation at delivery of the recording sheets, even when the duplex printing is executed.

[Other Variation]

Although the image forming device 12 is configured to form an image on the recording sheet P in the foregoing embodiment, the disclosure is not limited to such embodiment. The image forming device 12 may form an image on a different recording medium, other than the recording sheet P. For example, an overhead projector (OHP) sheet may be employed, to form an image.

The disclosure may be modified in various manners, without limitation to the configuration according to the foregoing embodiment. For example, although the image forming apparatus 10 is exemplified by the color multifunction peripheral in the embodiments, other types of image forming apparatus, such as a monochrome multifunction peripheral, a copier, or a facsimile machine may be employed instead. In addition, a laser-based image forming apparatus may be employed as the image forming apparatus 10, in place of the ink jet recording apparatus.

The configurations and processings of the foregoing embodiment, described with reference to FIG. 1 to FIG. 5H, are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming system comprising:
   an input device that receives an input of an instruction from a user;
   an image processing device that executes an RIP operation including generating a raster image by rasterizing print data represented by PDL data, with respect to each page;
   an image forming device that forms an image on a recording medium;
   a delivery device including a reversing mechanism that reverses the recording medium on which the image has been formed, and configured to deliver the recording medium; and
   a controller including a processor, and configured to cause, when the processor executes a control program, the image forming device to form the image represented by the raster image on the recording medium, with respect to each page, according to an order of generation of the raster image, and causes the delivery device to deliver the recording medium without reversing, or to reverse the recording medium with the reversing mechanism and to deliver the recording medium, according to an instruction indicating face orientation at delivery, received through the input device,
   the controller being configured to cause the image processing device to:
   execute the RIP operation in a forward order with respect to the print data, upon receipt, through the input device, of a first instruction indicating one of a combination of reverse order and face-up orientation, and a combination of forward order and face-down, as the combination of the sorting order and the face orientation at delivery of the recording medium on which the image has been formed; and
   execute the RIP operation in the reverse order with respect to the print data, upon receipt, through the input device, of a second instruction indicating one of a combination of forward order and face-up orientation, and a combination of reverse order and face-down, as the combination of the sorting order and the face orientation at delivery.

2. The image forming system according to claim 1, wherein the controller is configured to:
   cause the image forming device, when the image processing device has executed the RIP operation in the forward order, and an instruction indicating duplex printing is received through the input device, to form the image generated through an odd-numbered process on a first face of the recording medium, and the image generated through an even-numbered process on a second face of the recording medium; and
   cause the image forming device, when the image processing device has executed the RIP operation in the reverse order, and an instruction indicating the duplex printing is received through the input device, to form the image generated through an even-numbered process on the first face of the recording medium, and the image generated through an odd-numbered process on the second face of the recording medium.

3. The image forming system according to claim 2, Wherein, when the second instruction and an instruction indicating the duplex printing are received through the input device, and the print data consists of odd pages, the controller causes the image processing device to execute the RIP operation in the reverse order, along with insertion of a blank page at a leading position.

4. The image forming system according to claim 2, wherein the controller is configured to:
   cause the delivery device, when an instruction indicating the duplex printing and an instruction indicating the face-up orientation are received through the input device, to reverse the recording medium with the reversing mechanism and deliver the reversed recording medium; and
   cause the delivery device, when an instruction indicating the duplex printing and an instruction indicating the face-down orientation are received through the input device, to deliver the recording medium without reversing using the reversing mechanism.

5. The image forming system according to claim 1, wherein the controller is configured to:
   cause the delivery device, when an instruction indicating the simplex printing and an instruction indicating the face-up orientation are received through the input device, to deliver the recording medium without reversing using the reversing mechanism; and
   cause the delivery device, when an instruction indicating the simplex printing and an instruction indicating the face-down orientation are received through the input device, to reverse the recording medium with the reversing mechanism and deliver the reversed recording medium.

* * * * *